US007970407B2

(12) United States Patent
Vincent

(10) Patent No.: US 7,970,407 B2
(45) Date of Patent: Jun. 28, 2011

(54) METHOD OF OPTIMISING THE CAPACITY OF A MOBILE TELEPHONY NETWORK FOR THE CREATION OF SERVICES WITH A PREDOMINANTLY DOWNLINK FLOW

(75) Inventor: Francois Vincent, Clamart (FR)

(73) Assignee: Societe Francaise du Radiotelephone, Paris (FR)

( * ) Notice: Subject to any disclaimer, the term of this patent is extended or adjusted under 35 U.S.C. 154(b) by 1069 days.

(21) Appl. No.: 11/752,445

(22) Filed: May 23, 2007

(65) Prior Publication Data

US 2008/0004028 A1 Jan. 3, 2008

(30) Foreign Application Priority Data

May 23, 2006 (FR) ...................................... 06 04596

(51) Int. Cl.
*H04W 40/00* (2009.01)
(52) U.S. Cl. ........ 455/446; 455/423; 715/733; 715/734; 715/735; 715/736
(58) Field of Classification Search .................... 455/446
See application file for complete search history.

(56) References Cited

U.S. PATENT DOCUMENTS

| 6,308,072 | B1 * | 10/2001 | Labedz et al. ................ 455/448 |
| 6,891,897 | B1 * | 5/2005 | Bevan et al. .................. 375/265 |
| 2003/0236089 | A1 * | 12/2003 | Beyme et al. ................. 455/423 |
| 2005/0136965 | A1 * | 6/2005 | Fourestie et al. ............. 455/522 |
| 2008/0254748 | A1 * | 10/2008 | Nyberg et al. ............. 455/67.11 |
| 2009/0176500 | A1 * | 7/2009 | Panico et al. ................. 455/446 |
| 2009/0305709 | A1 * | 12/2009 | Panico et al. ................. 455/446 |
| 2009/0319236 | A1 * | 12/2009 | Blaunshtein et al. ............. 703/1 |

FOREIGN PATENT DOCUMENTS

| WO | 2004056146 A | 7/2004 |
| WO | 2006033603 A | 3/2006 |

OTHER PUBLICATIONS

European Search Report dated Sep. 5, 2007.
* cited by examiner

*Primary Examiner* — Charles Appiah
*Assistant Examiner* — Mazda Sabouri
(74) *Attorney, Agent, or Firm* — Perman & Green, LLP

(57) ABSTRACT

This invention relates to a method of optimising the capacity of at least one WCDMA type mobile telephony network (RT) to create at least one additional service (MBMS) for which the data flow is predominantly in the downlink direction, the method being characterized in that it includes the following steps: creation of at least one planned traffic map (CT) representing the forecast coverage of the network (RT) and the power necessary to use services, for at least one planned deployment date (DD) for the network (RT); calculation of the power available in each cell (CR) in the network (RT) in the absence of emission diversity and then a step of calculation of the power available in each cell (CR) in the network (RT) in the presence of emission diversity; creation of at least one list of cells for which emission diversity has to be installed as a function of at least a number (N) of transmission channels required for the service (MBMS) for which the flow is predominantly in the downlink direction.

14 Claims, 4 Drawing Sheets

METHOD OF OPTIMISING THE CAPACITY OF A MOBILE TELEPHONY NETWORK FOR THE CREATION OF SERVICES WITH A PREDOMINANTLY DOWNLINK FLOW

FIELD

This invention relates to the field of telephony and particularly third generation (3G) mobile telephony networks. The field of mobile telephony is growing quickly and third generation mobile telephony networks offer increasingly varied services, with a pass band of the order of one megabyte per second.

BACKGROUND

In mobile telephony systems in the GSM (Global System for Mobile communication) generation, data transmitted by radio frequency are organised in data frames divided into a plurality of time intervals with one time interval for each user and all these users can use the same frequency for communication with their mobile communication terminal. This division of data frames, called Time Division Multiple Access (TDMA) cannot give very high transmission rates (speeds).

In third generation systems, data may be transmitted using different codes that enable a plurality of mobile communication terminals to use the same radio frequency but with different codes. This technology is called Code Division Multiple Access (CDMA). Recent developments in third generation telephony networks can use the two types of radio frequency divisions for data transmission. For example UMTS-HSDPA (Universal Mobile Telecommunications System-High Speed Downlink Packet Access) type systems enable to multiplex different subscribers both in time intervals and by different codes.

For example, third generation (3G) mobile telephony networks in Europe use the UMTS (Universal Mobile Telecommunications System) standard defined by the 3GPP (Third Generation Partnership Project) standard. The WCDMA (Wide-Band Code Division Multiple Access) technology used at the moment in UMTS can give a pass band of the order of one megabyte per second. The current version of the UMTS called R99 (Release 99) is gradually being replaced by the HSDPA (High Speed Downlink Packet Access) that can achieve high pass bands for data transmission, at least in the downlink direction, in other words from emitters or Base Transceiver Stations (BTS) to mobile communication terminals present in their zone of influence (commonly called "cell"). These new transmission technologies enable operators to offer advanced new services such as videophone, Internet browsing, Multimedia Broadcast/Multicast Service (MBMS).

One problem that arises in the field of mobile telephony in general is Radio Resources Management (RRM) as a function of the topology of networks and their use by subscribers. Good exploitation (or operation) of the frequencies of a mobile telephony network actually requires optimised management of the radio resources used, both in the uplink direction and in the downlink direction. In these modern networks, transmission speeds within a network cell vary quickly and enormously as a function of the use of the different services by users. Therefore, it is important to enable efficient dynamic management of the data flow passing through Base Transceiver Stations (BTS) for the different mobile communication terminals present in their zone of influence, and to monitor the quality of services supplied. Furthermore, with the development of new technologies used in third generation systems, transmissions have become asymmetric, in other words the downlink flow (from the base transceiver station to mobile terminals) is higher than the uplink flow (from terminals to the base transceiver station). Thus for example, all that is necessary to offer multimedia broadcasting services, is to have free passband on the downlink only. The problem that then arises is to minimise the cost and radioelectric spectrum necessary to implement such asymmetric services.

Prior art describes a solution to increase the capacity of WCDMA mobile telephony networks consisting of increasing the power of the base transceiver station (BTS). However, this solution has the disadvantages that it cannot only increase the capacity in the downlink direction, while the increase in interference then limits the increase in capacity. Prior art also describes a solution that consists of using additional frequencies (a carrier). However, it is not always possible to add a carrier due to the rarity of available frequencies, and this solution is also too expensive and it cannot increase the capacity in the downlink direction only. Finally, prior art describes solutions for increasing the capacity of telephony networks due to reception diversity or emission diversity. Reception diversity consists of providing mobile communication terminals with a second antenna collecting the signal sent by base transceiver stations, in the same way as the first antenna. The mobile communication terminal then reconstructs the signal by correlating signals received by its two antennas and consequently the emission power of the base transceiver station may be reduced, which increases the network capacity correspondingly. However, this solution is not an adapted solution for broadcasting services to several mobiles because it depends on the mobile terminals in use. The power necessary for broadcasting information on the zone is fixed by the least efficient terminal. Therefore, this solution cannot be controlled by mobile telephony operators. Emission diversity consists of base transceiver stations emitting their signal on an additional transmission channel and mobile terminals then receiving two instances of the same signal so that they can more easily reconstruct said signal. The power necessary for the base transceiver station can then be reduced, which means that the network capacity can be increased. However, this solution remains expensive because it requires the addition of a transmission channel on the base transceiver stations. Therefore, it is necessary to initially select the base transceiver stations on which emission diversity has to be installed, so as to minimize the cost.

In this context, it is useful to be able to propose a solution capable of optimising the capacity of mobile telephony networks by precisely targeting the base transceiver stations on which emission diversity must be added so that downlink services can be created.

SUMMARY

The purpose of this invention is to eliminate the disadvantages of prior art by describing a method of optimising the capacity of telephony networks to create downlink services for managing traffic distribution and determining base transceiver stations on which emission diversity is to be installed, starting from traffic estimates and depending on the number of downlink channels to be added to the network.

This purpose is achieved by a method of optimising the capacity of at least a WCDMA type mobile telephony network to create at least one additional service for which the data flow is predominantly in the downlink direction, by installing emission diversity within the network, the network comprising a plurality of transceivers, called base transceiver stations, setting up communications with mobile communication terminals present in their zone of influence, called a cell, all of these cells defining the coverage zone of the network, the method being characterised in that it comprises the following steps implemented by at least one computer system called a simulator, comprising memory means to store at least one algorithm controlling operations carried out by data processing means of the simulator:

creation, by the data processing means of the simulator, of data representing the forecast coverage of the network and the power necessary for the use of services by holders of mobile communication terminals present in the coverage zone of the network, these data being generated for at least one planned deployment date of the network and grouped in the form of at least one map for each date, so-called planned traffic map, stored in the memory means of simulator;

calculation of the power available in each cell in the network in the absence of emission diversity, and then calculation of the power available in each cell in the network in the presence of emission diversity, these two calculations carried out by the data processing means of simulator, being dependant on the frequencies (called carrier frequencies), on which data transmissions within the network are based, and their results being stored in the memory means of the simulator;

creation, by the data processing means of the simulator, of at least one list of cells for which emission diversity has to be installed as a function of at least a number of transmission channels required for the service for which the flow is predominantly in the downlink direction, this list being stored in the memory means of simulator.

According to another feature, the steps in the method are implemented prior to the deployment of the network for a plurality of planned deployment dates for the network and are iterated for each of these dates.

According to another feature, the step of creation of at least one planned traffic map comprises a step of calculation, by the data processing means of simulator, of a signal attenuation level in each cell in the network, estimated from elevation and geographic data associated with each base transceiver station in the network and stored in the memory means of simulator, this step resulting in the creation of data representing attenuation levels expected at each point in each cell in the network, stored in the memory means of simulator.

According to another feature, the step of creation of at least one planned traffic map comprises a step of calculation, by the data processing means of simulator, of the probability that a mobile communication terminal present in the coverage zone of the network can set up a communication with at least one base transceiver station, for each of the different services available within the network and for each cell in the network, this probability of access of terminals to services depending on a reception level expected at each point in each cell in the network, this expected reception level corresponding to the maximum power of base transceiver stations weighted by attenuations levels expected at each point in each cell in the network, the maximum power level of the base transceiver stations being stored in the memory means of simulator and combined with data representing attenuation levels expected at each point in each cell in the network to generate, in these memory means, data representing reception levels expected at each point in each cell in the network.

According to another feature, the step of calculation of the probability of access of a mobile communication terminal to the different services available within the network comprises a step of comparison of the reception levels expected at each point in each cell in the network, with a minimum sensitivity threshold (pathloss threshold) to set up a communication between a base transceiver station and a mobile communication terminal, for the service considered, the standard value of this minimum sensitivity threshold (pathloss threshold) being stored in the memory means of simulator, this probability that a mobile communication terminal sets up a communication with a base transceiver station depending on the difference between the reception level expected at the point at which it is located in the cell of this base transceiver station and this minimum sensitivity threshold (pathloss threshold).

According to another feature, the step of calculation of the probability of access of mobile communication terminals to the different services available within the network takes account of the possibility of a mobile communication terminal setting up a simultaneous communication called soft hand-over with several base transceiver stations, using a step of comparison of the difference between reception levels expected at points belonging to at least two cells in the network due to the corresponding base transceiver stations for these cells to which they belong, and a minimum overlap threshold (SHO threshold).

According to another feature, the step of creation of at least one planned traffic map comprises a step of calculation, by the data processing means of simulator, of the emission power in base transceiver stations necessary to carry the planned traffic within the network, in other words the power necessary for the use of services by holders of mobile communication terminals present in the coverage zone in the network, this step consisting of calculating the sum of the powers at each point at which the probability of access to services is not zero in each of the cells in the network, weighted by a weight assigned to the traffic at each point, starting from an effective traffic map, stored in the memory means of the simulator and comprising data representing effective traffic measured earlier during a previous deployment of the network, the weight assigned to the different points of each cell being weighted by a traffic change coefficient, also stored in the memory means of the simulator and estimated based on traffic change forecasts, the sum of the powers at each point at which the probability of access to services is not zero being calculated based on expected reception levels calculated during the step of calculation of the probability of access of terminals to the different services.

According to another feature, the step of calculation of the emission power necessary to carry the planned traffic comprises an additional step to multiply the sum of the powers at each point at which the probability of access to services is not zero by a power reduction coefficient depending on the efficiency of technologies on which the different services available within the network are based, this power reduction coefficient being stored in the memory means of simulator and used to weight the power estimated during the step to calculate the emission power necessary to carry the planned traffic.

According to another feature, the power reduction coefficient, depending on the efficiency of technologies on which the different services available within the network are based, is stored in the memory means of simulator in relation to the planned traffic maps, the different traffic maps, corresponding to different deployment dates for the network, possibly each being associated with a different power reduction coefficient to take account of changes in the efficiency of the services due to the change in existing mobile communication terminals and transmission technologies used within the network, the method then comprising a step of searching for the power reduction coefficient corresponding to the deployment date to which the planned traffic map currently being used by the processing means of the simulator corresponds.

According to another feature, the step of calculation of the available power in each cell in the network in the absence of emission diversity comprises a step of calculation of the number of carriers necessary to carry the planned traffic, followed by a step of calculation of the power available after the planned traffic has been carried, each of the carriers having a nominal power, of which a percentage is dedicated to signaling channels for this carrier and a percentage can be used to carry traffic, the step of calculation of the number of carriers consisting of dividing the total power necessary to carry the traffic by the percentage of the nominal power that can be used to carry the traffic, for each cell in the network, and then rounding the result of this division to the next higher integer, the step to calculate the available power after the planned traffic has been carried consisting of multiplying the percentage of the nominal power that can be used to carry the traffic by the number of carriers thus calculated, for each cell in the network, then subtracting the result of this multiplication by the total power necessary to carry the traffic.

According to another feature, the step of calculation of the available power in each cell in the network in the presence of emission diversity comprises a step of estimation, by the processing means of the simulator, of the gain provided by the addition of emission diversity for each transmission channel within the network, during reconfiguration of the resources in the network using at least one resource management algorithm, this gain being represented by at least one coefficient of power reduction due to the addition of emission diversity, stored in the memory means of the simulator, for each channel supporting the different services available within the network and for signaling channels, this step of gain estimation consisting of using the power reduction coefficient by adding emission diversity corresponding to the resource management algorithm that is (or will be) used to install emission diversity within the network.

According to another feature, the resource management algorithm concentrates available power on the first carrier common to each of the base transceiver stations so as thus to release in it the maximum power to provide the additional service for which the flow is predominantly in the downlink direction and to install emission diversity in it.

According to another feature, firstly, the resource management algorithm gives priority to the service type for which the gain provided by emission diversity is the greatest, on the carrier on which emission diversity is installed, and secondly the step of calculation of the power available in each cell in the network in the presence of emission diversity comprises a step of calculation of the difference between the percentage of the nominal power of this carrier with emission diversity that can be used to carry traffic, and the power consumed on this carrier by the service for which the gain provided by emission diversity is the greatest.

According to another feature, the step of creation of a list of cells requiring the installation of emission diversity comprises a step of searching for the minimum available power in the presence of emission diversity in all cells in the network, a step of calculation of the power necessary to implement at least a determined number of transmission channels necessary to provide the service for which the flow is predominantly in the downlink direction, and a step for searching for the number and the list of cells for which the power available in the absence of emission diversity is less than the power necessary to implement the determined number of transmission channels and therefore requiring the installation of emission diversity.

According to another feature, the step of calculation of the power necessary to implement at least a determined number of transmission channels and the step for searching for the number and list of cells requiring the installation of emission diversity are iterated, the number of iterations being equal to the maximum number of transmission channels dedicated to the service for which the flow is predominantly in the downlink direction, the successive iterations being made for an increasing number of channels until the maximum number of channels is reached, this maximum number of channels being calculated in the step for searching for the minimum available power in all cells in the network in the presence of emission diversity.

According to another feature, the method includes a step to calculate the cost of implementing each transmission channel dedicated to the service for which the flow is predominantly in the downlink direction, performed by the data processing means of the simulator, by means of the plurality of iterations in the step of creation of the list of cells requiring emission diversity, as a function of the increasing number of channels.

BRIEF DESCRIPTION OF THE DRAWINGS

Other features and advantages of this invention will become clearer after reading the following description with reference to the attached drawings among which.

DETAILED DESCRIPTION

Figure 1:
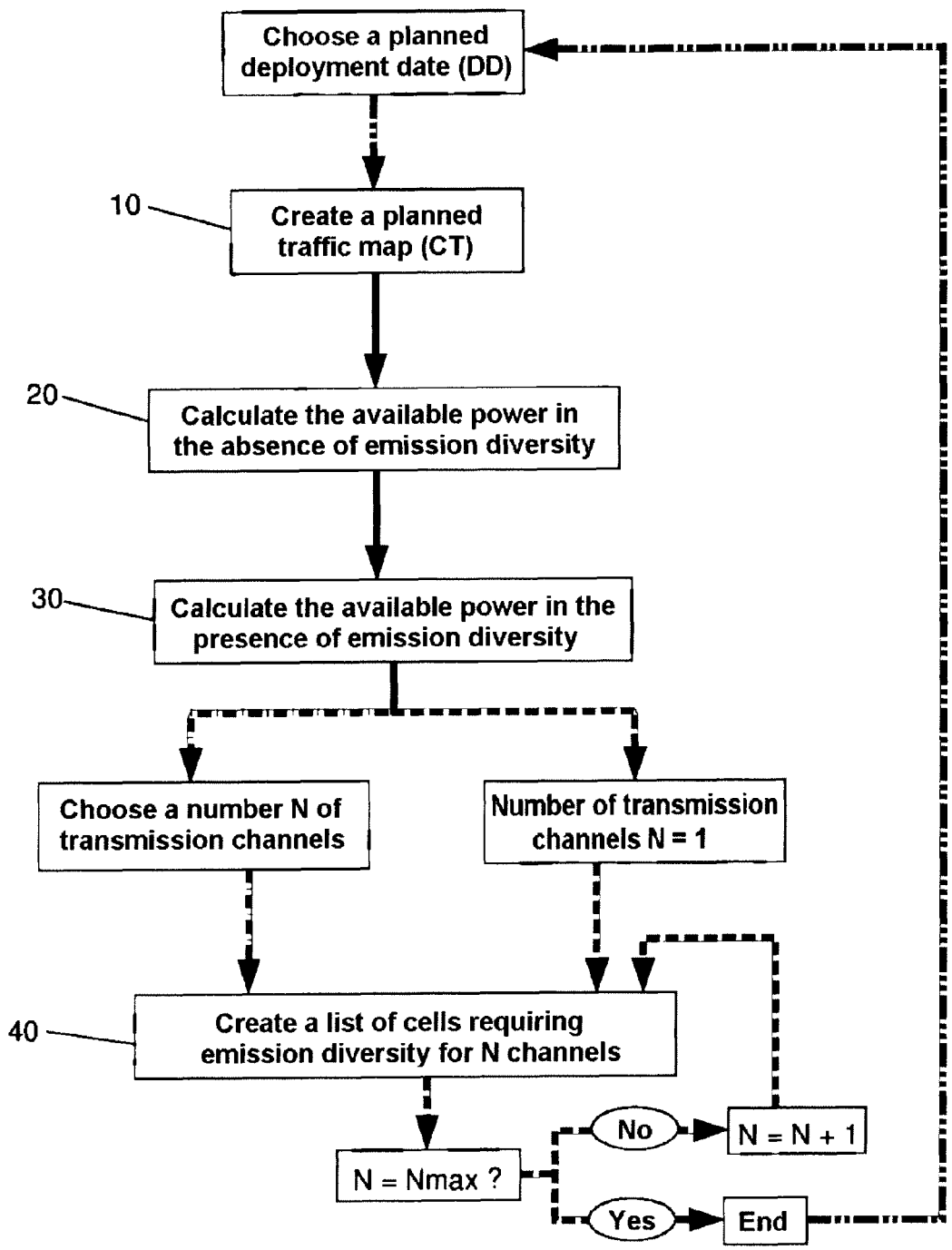
FIG. 1 shows the main steps in an embodiment of the method according to the invention.

This invention relates to a method for optimising the capacity of at least one mobile telephony network (RT) for the creation of at least one additional service (MBMS) for which the flow is predominantly in the downlink direction, thanks to (due to) the installation of emission diversity within the network (RT). This invention is particularly adapted to third generation mobile telephony networks, and particularly networks supported by the WCDMA (Wide-Band Code Division Multiple Access) technology. Thus, the invention aims particularly at optimising mobile telephony networks satisfying the UMTS (Universal Mobile Telecommunications System) standard defined by the 3GPP (Third Generation Partnership Project) standard. However, this invention could also be applied to other types of networks provided that they are supported by a CDMA (Code Division Multiple Access) type technology. The existing version of UMTS called R99 (Release 99) is gradually being complemented by the HSDPA (High Speed Downlink Packet Access) capable of achieving high pass bands for data transmission, at least in the downlink direction, in other words from emitters or base transceiver stations (BTS) to mobile communication terminals (MP) present in their zone of influence (cell).

For the purpose of this description, the term "service" refers to any type of service provided using a given technology by a mobile telephony service provider called a "mobile telephony operator" in this description. Thus the term "MBMS service" will be used to denote multimedia broadcasting services using the MBMS technology or the "R99 service" for all services supported by the R99 version of the UMTS standard or the "HSDPA service" for all services supported by the HSDPA version of the UMTS standard. The R99 and HSDPA versions actually enable mobile telephony operators to provide various types of services to users of mobile communication terminals present in the zone of influence of mobile telephony networks belonging to these operators. These different services will be grouped together in this description as a function of the technology used to support them. For example, voice data transmission services (conventional telephone calls) or Internet browsing services (that can also be supported by the R99 technology or the HSDPA technology particularly due to voice on IP functions) will be grouped in this description under the term R99 service or HSDPA service depending on the technology type used for a given service.

For the purpose of this description, the term "mobile communication terminal" means any type of terminal capable of setting up communications within a mobile telephony network satisfying the UMTS standard. Therefore for example, this term could denote a mobile telephone but also a portable computer or a Personal Digital Assistant (PDA) provided with mobile telephony communication means. In the terminology specific to the UMTS standard, base transceiver stations (BTS) will commonly be called "Node B", but the term "base transceiver station" (BTS) will be used herein to denote these transceiver devices that set up communications with mobile communication terminals present in their zone of influence. By extension, the expression "base transceiver station" in this description will refer to all equipment used by the mobile telephony operator to set up communications in a given cell in the network. Therefore, for this description, a "base transceiver station" means all electronic equipment (amplifiers, antennas, etc.) used by the operator in a given cell. Operators use third generation networks to provide many advanced services such as videophone services, Internet browsing or multimedia broadcasting such as the MBMS service (Multimedia Broadcast/Multicast Service). Some of these services, for example such as multimedia broadcasting, have a predominantly downlink flow. The power of the downlink flow (commonly called the "downlink power") necessary to provide these asymmetric services does not leave sufficient power for other more symmetric services, such that the full capacity available on the uplink cannot be used. Therefore to install this type of asymmetric service within a mobile telephony network, it is desirable to release downlink power only, so as to not waste the uplink capacity. This can be done by two solutions that are not incompatible with each other, but for which the effect is not fully accumulative. These two solutions consist of adding "reception diversity" in mobile communication terminals and adding "emission diversity" at base transceiver stations (BTS) for symmetric and asymmetric services.

Reception diversity consists of providing mobile communication terminals with a second antenna collecting the signal emitted by base transceiver stations, in the same way as the first antenna. The mobile communication terminal then reconstructs the signal by correlating signals received by its two antennas, and consequently the emission power of the base transceiver station can be correspondingly reduced for the same reception quality, that increases the network capacity. This solution is already envisaged to improve HSDPA speeds and can be extended to include all services. However, the increase in the network capacity enabled by this solution depends on existing mobile communication terminals and therefore mobile telephony operators may find it difficult to determine, in advance, the gain that will be provided by this solution. Emission diversity consists of base transceiver stations sending their signal on an additional transmission channel and in that mobile terminals receiving two instances of the same signal then more easily reconstruct the signal. The power necessary for the base transceiver station can then be reduced, which makes it possible to increase the network capacity. Therefore, this solution does not depend on existing mobile communication terminals and can be used by mobile telephony operators who can predict, in advance, the cells in which this emission diversity has to be added to increase the network capacity. This emission diversity enables the operator to dedicate some of the power in his network to create a service with a predominantly downlink flow, for example such as an MBMS service. On the other hand, if the operator allocates too much power to the new service, the quality of the others will be reduced and conventional call admission control procedures can cause rejection of too many calls. The operator then has to choose the power that he wants to allocate to the new service depending on the ratio of rejected calls that he wants to be tolerated within his network as a function of the required speed (transmission rate) for the new service. Therefore, installation of emission diversity on a base transceiver station depends on a decision threshold that depends on traffic change within the network. However, this solution has a non-negligible cost for the operator, because it means that an additional emission channel has to be installed in the base transceiver stations. This additional channel requires a second amplification channel that is accompanied by adding a duplexer (filter to combine reception and emission on the same cable) or a feeder (coaxial cable connecting a node B to an antenna), in a manner known in itself. Therefore, it is necessary to precisely estimate which base transceiver stations within the network would require the addition of emission diversity, so as to minimise the cost of implementation. Therefore, the invention is designed to optimise the capacity of the telephony network, thanks to the addition of emission diversity, in order to create a new service for which the flow is predominantly in the downlink direction, by precisely estimating the cells in which this emission diversity has to be added. The method according to the invention is implemented by at least one computer system called the simulator (S) combining memory means (S2) storing at least one algorithm controlling operations done by data processing means (S1) of the simulator (S).

In a manner known in itself, the mobile telephony network (RT) is defined here according to its coverage zone that is composed of a set of cells (CR). Each of these cells corresponds to the field of influence of a base transceiver station (BTS). As mentioned above, these base transceiver stations (BTS) correspond to transceivers setting up communications with mobile communication terminals (MP) present in their field of influence. The simulator (S) simulates the coverage zone of the network (RT) and can estimate the power necessary in the different cells (CR). The simulation can be done before deployment of the network (RT). Thus, the invention allows the simulation to concern at least one planned deployment date (DD) for the network (RT). Mobile telephony operators plan the dates on which they will set up new base transceiver stations, new services, etc. Thus, the simulation can be done for several planned deployment dates (DD). Therefore, the method can eventually include a step to select a deployment date (DD). On the other hand, the method can also be used in a single step but with several successive iterations, each iteration applying to a given deployment date. Thus, steps in the method can be implemented for predicting the deployment of the network (RT) for a plurality of planned deployment dates (DD) of the network (RT) and iterated for each of these dates (DD). FIG. 1 shows the main steps in the method according to one embodiment of the invention, and represents this possibility of a plurality of iterations by a dotted line arrow connecting the last step to the first step and symbolising a possible repetition of all steps represented in FIG. 1. Note incidentally that FIG. 1 comprises several arrows shown in solid lines and several arrows in which the spacing between the dots and the dashes varies. Arrows with different spacings represent different options in the sequence of steps in the method, while arrows with dots at constant spacing apply to the same option in the sequence of steps. Naturally, the simulator (S) may comprise means (S3) for inputting and displaying (or input and display means) so that a user of this simulator (S) can display and input his choices particularly for the deployment dates (DD) for which he wants to optimise the capacity of the network (RT). In order to optimise the capacity of the network (RT), the simulation must naturally take account of data related to the traffic within the network (RT). Thus, the process begins with a step of creation (10), by the data processing means (S1) of the simulator (S), of data representing the coverage forecasts of the network (RT) and the power necessary for the use of services by holders of mobile communication terminals (MP) present in the coverage zone of the network (RT). As mentioned above, the simulation may apply to one or several deployment dates (DD) for the network (RT). Therefore, the data created during this step (10) will be generated for at least one planned deployment date (DD) for the network (RT) and grouped in the form of at least one map for each date (DD), called the planned traffic map (CT), stored in the memory means (S2) of the simulator (S).

Figure 2:
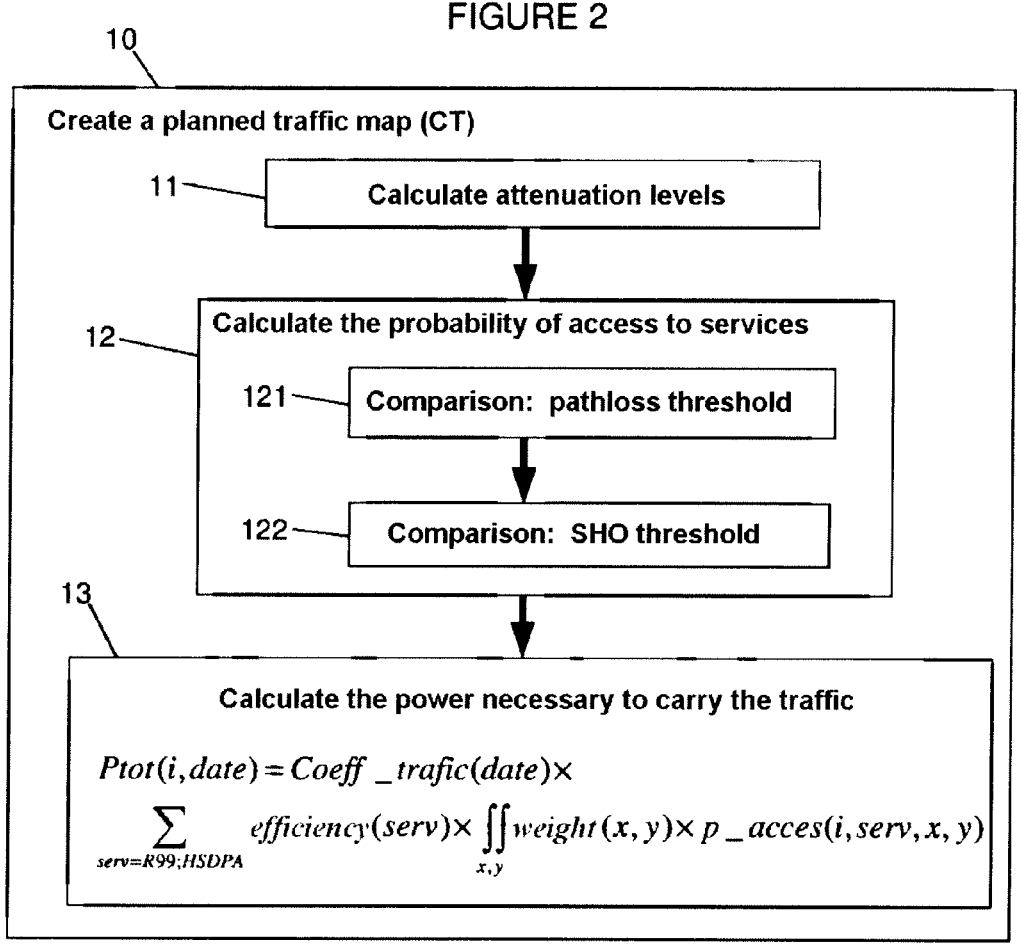
FIG. 2 shows details of an embodiment of the step to create a planned traffic map in the method according to the invention.

As can be seen clearly particularly in FIG. 2, the step (10) to create at least one planned traffic map (CT) comprises a step (11) of calculating (or computing), by the data processing means (S1) of the simulator (S), of a signal attenuation level in each cell (CR) in the network (RT). This signal attenuation level is estimated, by the data processing means (S1) of the simulator (S), from the elevation and geographic data associated with each of the base transceiver stations (BTS) in the network (RT) and stored in the memory means (S2) of the simulator (S). This calculation (11) of the attenuation levels of each cell (CR) results in the creation of data representing attenuation levels expected at each point in each cell in the network (RT). The simulator (S) will then store these data in its memory means (S2). The data processing means (S1) of the simulator (S) then use these data to perform a step of calculation (12) the probability that a mobile communication terminal (MP) present in the coverage zone of the network (RT) can set up a communication with at least one base transceiver station (BTS). This step consists of calculating a probability of access of terminals (MP) to each of the different services available within the network (RT), for each cell (CR) in the network (RT). This probability of access of terminals (MP) to services naturally depends of the reception level expected at each point in each cell in the network (RT). This expected reception level corresponds to the maximum power of base transceiver stations (BTS) weighted by the expected attenuation levels calculated in the previous step (11). The maximum power of the base transceiver stations (BTS) is known in advance and is stored in the memory means (S2) of the simulator (S) to be combined with data representing attenuation levels expected at each point in each of the cells in the network (RT) and to generate, in these memory means (S2), data representing reception levels expected at each point in each cell in the network (RT).

As a result of these expected reception levels, the data processing means (S1) of the simulator (S) can then calculate the probability of access of terminals to the different services, for example using an algorithm stored in the memory means (S2) of the simulator (S). For example, in one embodiment of this step (12) to calculate the probability of access of a mobile communication terminal (MP) to the different services available within the network (RT), the probability will be calculated as a function of a sensitivity threshold of mobile communication terminals (MP) for the service considered. In telephony networks, attenuation of the signal between base transceiver stations (BTS) and mobile communication terminals (MP) is commonly called pathloss. Depending on the attenuation or pathloss affecting the signal, the mobile communication terminals (MP) present in a given cell (CR) require an adjustment of the power emitted by the base transceiver station (BTS) so that the received power level exceeds the sensitivity threshold of mobile communication terminals (MP) for the service considered, within the limit of the maximum power of the base transceiver station. In this description, this threshold is referred to as the "pathloss threshold", because communication will be possible provided that the difference between the emitted power and the pathloss is greater than or equal to the sensitivity of the mobile communication terminal (MP) for the service considered. Such a threshold is considered as being the minimum power level below which it is not reasonable to consider that a mobile communication terminal can set up a sufficiently reliable communication with the base transceiver station due to the value of the maximum power emitted by the base transceiver station (BTS) and the pathloss affecting the signal. In this embodiment, the method then includes a step (121) to compare levels expected at each point of each of cell in the network (RT) with a minimum sensitivity threshold (pathloss threshold) to set up a communication between a base transceiver station (BTS) and a mobile communication terminal (MP) for the service considered. The standard value used for this minimum sensitivity threshold (pathloss threshold) can be stored in the memory means (S2) of the simulator (S), or can be chosen by the user of the simulator (S) using input and display means (S3). This calculation step can take account of the fact that the probability that a mobile communication terminal (MP) sets up a communication with a base transceiver station (BTS) depends on the difference between the reception level expected at the point at which it is located in the cell (CR) of this base transceiver station (BTS) and this minimum sensitivity threshold (pathloss threshold). In one embodiment, this probability will be calculated according to an "on/off" law, in other words if the expected reception level value is greater than the minimum sensitivity threshold (pathloss threshold), the probability will be estimated as being equal to 100%, whereas if the value of the expected reception level is less than the minimum sensitivity threshold (pathloss threshold), the probability will be estimated as being 0%. In another embodiment of this step (12) to calculate the access probability, the access probability can be represented by a function proportional to the difference between the reception level and the minimum sensitivity threshold (pathloss threshold).

For R99 type services in the UMTS standard, the same mobile communication terminal (MP) may be attached simultaneously to two base transceiver stations (BTS). This simultaneous attachment is known as Soft Hand-Over, that is inherited from previous technologies in which a mobile communication terminal (MP) located in a geographic zone in which at least two cells partially overlap, can set up a communication with either of the base transceiver stations (BTS) and the terminal can then hand-over from one station to the other as a function of the reception level. In one embodiment of the step for calculating (12) the probability of access of mobile communication terminals (MP) to the different services available within the network (RT), this possibility of simultaneous communication, called soft hand-over (SHO), with several base transceiver stations (BTS) is taken into account. In this embodiment, the step (12) to calculate the access probability comprises a step of comparison (122) of the difference between reception levels expected at points belonging to at least two cells (CR) in the network (RT) simultaneously, due to the corresponding base transceiver stations (BTS) for these cells (CR) to which they belong, and a minimum overlap threshold (SHO threshold). Thus for R99 type services, it will be considered that a mobile communication terminal (MP) has a 100% probability of being attached to (setting up a communication with) a base transceiver station (BTS) for which the reception level is greater than the minimum sensitivity threshold (pathloss threshold) but also has a 100% probability of also being attached to a second base transceiver station (BTS) for which the reception level is greater than the minimum sensitivity threshold (pathloss threshold), and if the difference between the expected reception level for the first base transceiver station and the reception level expected for the second base transceiver station is less than the minimum overlap threshold (SHO threshold). Similarly, a terminal (MP) can set up communications with three base transceiver stations simultaneously. This terminal will then be considered to also have a 100% probability of being attached to a third base transceiver station (BTS) for which the reception level is greater than the minimum sensitivity threshold (pathloss threshold) and if the difference between the expected reception level for the first base transceiver station and the expected reception level for this third base transceiver station is less than the minimum overlap threshold (SHO threshold). Naturally, in this step it will be possible to consider the probability of access to services for as many base transceiver stations (BTS) as possible. On the other hand, there is no soft hand-over for the HSDPA service, and therefore a terminal will have a 100% probability of setting up a communication with a base transceiver station (BTS) if the reception level is greater than the minimum sensitivity threshold (pathloss threshold) of the terminal for the HSDPA service, for this base transceiver station, and a 0% probability if the reception level is less than the minimum sensitivity threshold (pathloss threshold). Finally, to complement the planned traffic map data, the step (10) to create at least one planned traffic map (CT) could include a step of calculation (13), by the data processing means (S1) of the simulator (S), of the necessary emission power in the base transceiver stations (BTS) to carry the planned traffic within the network (RT). This emission power necessary to carry the traffic corresponds to the power necessary for holders of mobile communication terminals (MP) present in the coverage zone of the network (RT) to use the services. This step (13) globally consists of calculating the sums of the powers at each point at which probability of access to services is not zero in each cell (CR) in the network (RT). This sum of the powers at each point at which the probability of access to services is not zero will naturally be calculated depending on the expected reception levels calculated during step (12) to calculate the probability of access of terminals to the different services. However, the use of the services by holders of mobile communication terminals (MP) is not uniform at all points in the network (RT). Therefore, this sum of powers will be weighted by a weight assigned to the traffic at each point. This traffic weight will be assigned from an effective traffic map (CTe) stored in the memory means (S2) of the simulator and comprising data representing effective traffic measured previously during a previous deployment of the network (RT). Similarly, traffic changes with time as a function of the types of mobile communication terminals (MP) used and the wishes of their users. The weight assigned to the different points in each of the cells (CR) will then be weighted by a traffic change coefficient, also stored in the memory means (S2) of the simulator and estimated based on predicted traffic variations. Finally, the different services do not have the same efficiency as a function of the technology on which they are based. Therefore, some services are more efficient and therefore require less power than others to operate. Consequently in one embodiment, the step (13) to calculate the emission power necessary to carry the planned traffic may comprise an additional step in which the sum of the powers at each point at which the probability of access to services is not zero is multiplied by a power reduction coefficient as a function of the efficiency of the technologies on which the different services available within the network (RT) are based. This power reduction coefficient will naturally be stored in the memory means (S2) of the simulator (S) and will be used to weight the power estimated during the step (13) in which the emission power necessary to carry the planned traffic is calculated. Thus the emission power denoted Ptot(i, date) necessary to carry the planned traffic in a given cell (CR) (denoted i) on a given deployment date (DD) (called the date) will be calculated using the following formula:

$$Ptot(i, \text{date}) = \text{Coeff\_trafic}(\text{date}) \times \sum_{serv=R99;HSDPA} \text{efficiency}(serv) \times \int_{x,y} \int \text{weight}(x, y) \times \text{p\_acces}(i, serv, x, y)$$

where "p_acces(i,serv,x,y)" denotes the probability of access to a given service (serv), at a point with given coordinates (x,y) in a given cell (i);

"weight(x,y)" denotes the weight of the traffic assigned to each point with coordinates (x,y) in each cell (i);

"Coeff_trafic (date)" denotes the traffic change coefficient with respect to the traffic reference map (Cte);

"efficiency(serv)" denotes the power reduction coefficient as a function of the efficiency of the service (serv), R99 or HSDPA in the present example.

In one embodiment of the step (13) to calculate the emission power necessary to carry the planned traffic, different power reduction coefficients could be used depending on the considered deployment date (DD), and as a function of the efficiency of technologies. This power reduction coefficient as a function of the efficiency of technologies on which the different services available within the network (RT) are based, is stored in the memory means (S2) of the simulator (S) in relation to the planned traffic maps (CT). Thus, the different traffic maps (CT) corresponding to different deployment dates (DD) of the network (RT) may each be associated with a different power reduction coefficient to take account of changes in the efficiency of services due to the change in mobile communication terminals and transmission technologies within the network (RT). In this embodiment, the method will then include a step to search for the power reduction coefficient corresponding to the deployment date (DD) to which corresponds the planned traffic map (CT) currently being used by the processing means (S1) of the simulator (S).

Figure 4:
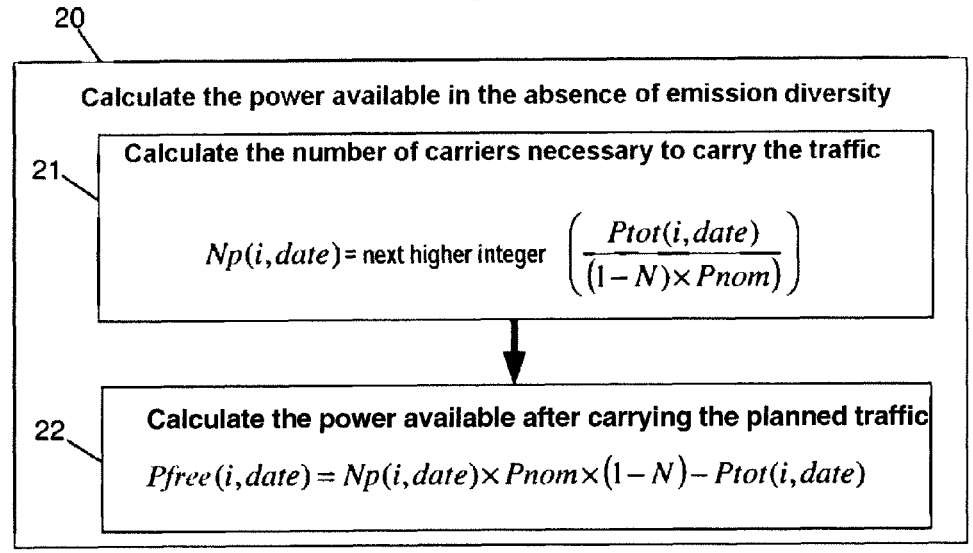
FIG. 4 shows details of an embodiment of the step to calculate the power available in the absence of emission diversity in the method according to the invention.

Once the planned traffic maps (CT) have been created by the processing means (S1) of the simulator (S), the power necessary for traffic flow is known for each cell (CR) in the network (RT). The method then continues with a step of calculation (20) of the power available in each cell (CR) in the network (RT) in the absence of emission diversity, then by a step of calculation (30) of the available power in each cell (CR) in the network (RT) in the presence of emission diversity. These two calculations performed by the data processing means (S1) of the simulator (S) depend on the so-called carrier frequencies on which data transmissions within the network (RT) depend, and their results will be stored in the memory means (S2) of the simulator (S) so that the subsequent steps can be implemented. As shown clearly in FIG. 4, the step (20) to calculate the available power in each cell (CR) in the network (RT) in the absence of emission diversity includes a step (21) to calculate the number of carriers necessary to carry the planned traffic, followed by a step (22) to calculate the available power after the planned traffic has been carried. In mobile telephony networks, each carrier has a nominal power, of which a percentage is dedicated to signaling channels of this carrier, and a percentage can be used to carry traffic. Signaling channels of a carrier in a given cell (CR) are channels used by all mobile communication terminals present in this cell so that they can be synchronised on the carrier. Therefore, the method requires knowledge about the percentage of the nominal carrier power dedicated to signaling channels and therefore the percentage that can be used to carry traffic. Either or both of the values of these percentages could be stored in the memory means (S2) of the simulator (S) so that the calculation (20) of the power available in each cell (CR) in the network (RT) can be made in the absence of emission diversity. The step of calculation (21) of the number of carriers consists of dividing the total power necessary to carry the traffic by the percentage of the nominal power that can be used to carry the traffic, for each cell (CR) in the network (RT), and then rounding the result of this division to the next higher integer. The number of carriers denoted Np(i, date) necessary to carry the traffic in a given cell (CR) (denoted i) and on a given deployment date (DD) (denoted date), will be calculated using the following formula:

$$Np(i, \text{date}) = nexthigher \text{ integer} \left( \frac{Ptot(i, \text{date})}{(1 - N) \times Pnom} \right)$$

where Pnom is the nominal power of the carrier;

N denotes the percentage of the nominal power dedicated to signaling of the carriers and (1−N) naturally denotes the percentage that can be used to carry the traffic;

Ptot(i,date) denotes the power necessary to carry the traffic in a given cell (CR) (denoted i) and on a given deployment date (DD) (denoted date), calculated during the step (13) to calculate the emission power necessary to carry the planned traffic.

Therefore, this step (21) to calculate the number of carriers necessary to carry the planned traffic can be used to determine the number of carriers that has to be used to carry the traffic, and knowing the total power necessary to carry the traffic, to thus deduce the power that remains available once the traffic has been carried by this number of carriers. The step of calculation (22) of the power available after all planned traffic has been carried then consists of multiplying the percentage of the nominal power that can be used to carry the traffic by this number of carriers thus calculated and then subtracting the result of this multiplication by the total power necessary to carry the traffic, for each cell (CR) in the network (RT). Therefore, the available power denoted Pfree(i,date), after the planned traffic has been carried in a given cell (CR) (denoted i) and on a given deployment date (DD) (denoted date), will be calculated using the following equation:

$$Pfree(i,\text{date}) = Np(i,\text{date}) \times Pnom \times (1-N) - Ptot(i,\text{date})$$

where Pnom is the nominal power of the carrier;

N denotes the percentage of the nominal power dedicated to signaling of carriers and (1−N) naturally denotes the percentage that can be used to carry the traffic;

Ptot(i,date) denotes the power necessary to carry the traffic in a given cell (CR) (denoted i) and on a given deployment date (DD) (denoted date), calculated during the step (13) to calculate the emission power necessary to carry the planned traffic.

Figure 3:
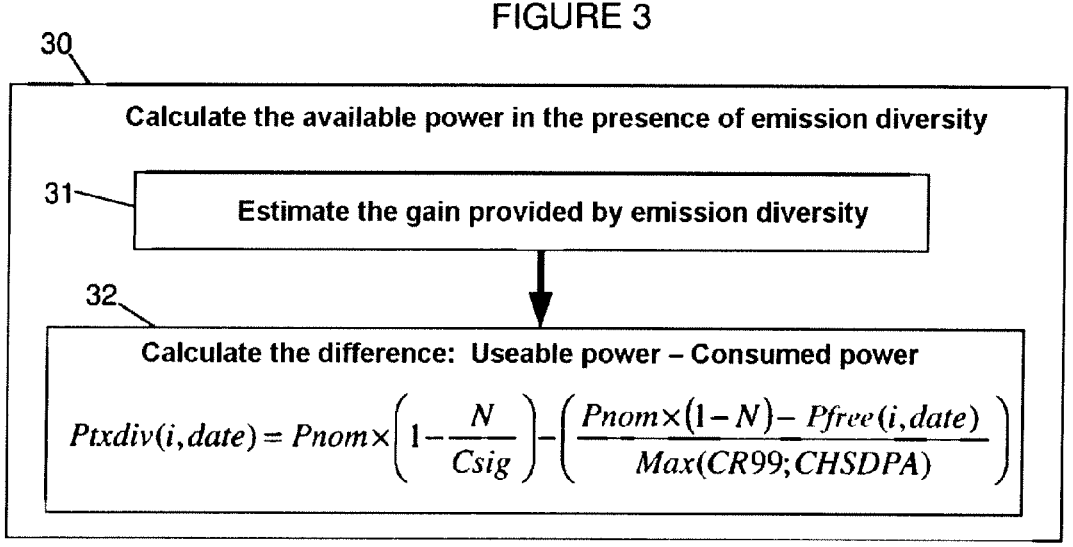
FIG. 3 shows details of an embodiment of the step to calculate the available power in the presence of emission diversity in the method according to the invention.

Therefore, these two calculation steps (21, 22) provide information about the power that will remain useable in each cell (CR) in the network (RT), once the planned traffic has been carried by the carriers, so that an additional service can be created without adding emission diversity. The method then continues by a calculation of the power that can be used once this emission diversity has been added on at least one of the carriers that can be used within the network (RT). As can be clearly seen in FIG. 3, the step (30) to calculate the power available in each cell (CR) in the network (RT) in the presence of emission diversity comprises a step of estimation (31), by the processing means (S1) of the simulator (S), of the gain obtained by adding emission diversity for each transmission channel within the network (RT). In one embodiment of the invention, addition of emission diversity is accompanied by a reconfiguration of resources of the network (RT) using at least one resource management algorithm (RRM), for example stored in the memory means (S2) of the simulator (S). This addition of emission diversity will naturally introduce a certain gain for signaling channels, a certain gain for transmission channels of the R99 service, and a certain gain for transmission channels of the HSDPA service. Thus, the gain introduced by the addition of emission diversity can be represented by at least one coefficient of power reduction by the addition of emission diversity, stored in the memory means (S2) of the simulator (S), for each channel supporting the different services (R99 and HSDPA in this example) available within the network (RT) and for signaling channels. When resources are reconfigured using a resource management algorithm (RRM), this step (31) to estimate the gain will consist of using coefficient of the power reduction due to the addition of emission diversity, corresponding to the resource management algorithm (RRM) that is used to install emission diversity within the network (RT). In one embodiment, the resource management algorithm (RRM) concentrates the available power on the first carrier common to each of the base transceiver stations (BTS) so as to release the maximum power to provide the additional service (MBMS) for which the flow is predominantly in the downlink direction and to install emission diversity. In this description, the first carrier is the carrier that is common to all base transceiver stations in the main layer of the network. Thus, the new service (MBMS) can be installed on this first carrier and can benefit from the macro diversity, in other words the mobile communication terminals (MP) will be able to receive MBMS channels from several base transceiver stations (BTS) at the same time because the first carrier is always present on all base transceiver stations (BTS), which is not necessarily the case for additional carriers. The power necessary to broadcast each MBMS channel can be lower than it would be if there was no macro diversity, thus increasing the number of possible MBMS channels, and this configuration can give the same number of MBMS channels in all cells (CR) in the network (RT) so as to guarantee continuity of the broadcast service on the network. In one embodiment of the method, the resource management algorithm (RRM) used for this reconfiguration of resources will give priority, on the carrier on which emission diversity is installed, to the service type for which the gain provided by emission diversity will be greatest. As mentioned above, the gain provided by emission diversity depends on the type of service, and it is beneficial if the resource management algorithm (RRM) can achieve the highest possible gain. This step (30) to calculate the power available in each cell (CR) in the network (RT) in the presence of emission diversity includes a step (32) to calculate the difference between the percentage of the nominal power of this carrier with emission diversity that can be used to carry traffic and the power consumed on this carrier by this service for which the gain provided by emission diversity is greatest. Thus, the power available in the presence of emission diversity, denoted Ptxdiv(i,date), in a given cell (CR) (denoted i) and on a given deployment date (DD) (denoted date), will be calculated using the following equation:

$$Ptxdiv(i, \text{date}) = Pnom \times \left(1 - \frac{N}{Csig}\right) - \left(\frac{Pnom \times (1-N) - Pfree(i, \text{date})}{\text{Max}(CR99; CHSDPA)}\right)$$

where Csig denotes the gain or power reduction coefficient provided to the signaling channels by the addition of diversity;

CR99 denotes the gain or power reduction coefficient provided to the R99 service channels by the addition of diversity;

CHSDPA denotes the gain or power reduction coefficient provided to the HSDPA service channels by the addition of diversity;

Max denotes the fact that the resource management algorithm (RRM) will be programmed to give priority to the service for which the added gain is the greatest;

Pnom denotes the nominal power of the carrier;

N denotes the percentage of the nominal power dedicated to signaling of the carriers and (1–N) naturally denotes the percentage that can be used to carry traffic;

Pfree(i,date) denotes the power available after the planned traffic has been carried, in a given cell (CR) (denoted i) and on a given deployment date (DD) (denoted date), calculated during the step (22) to calculate the power available after the planned traffic has been carried.

Figure 5:
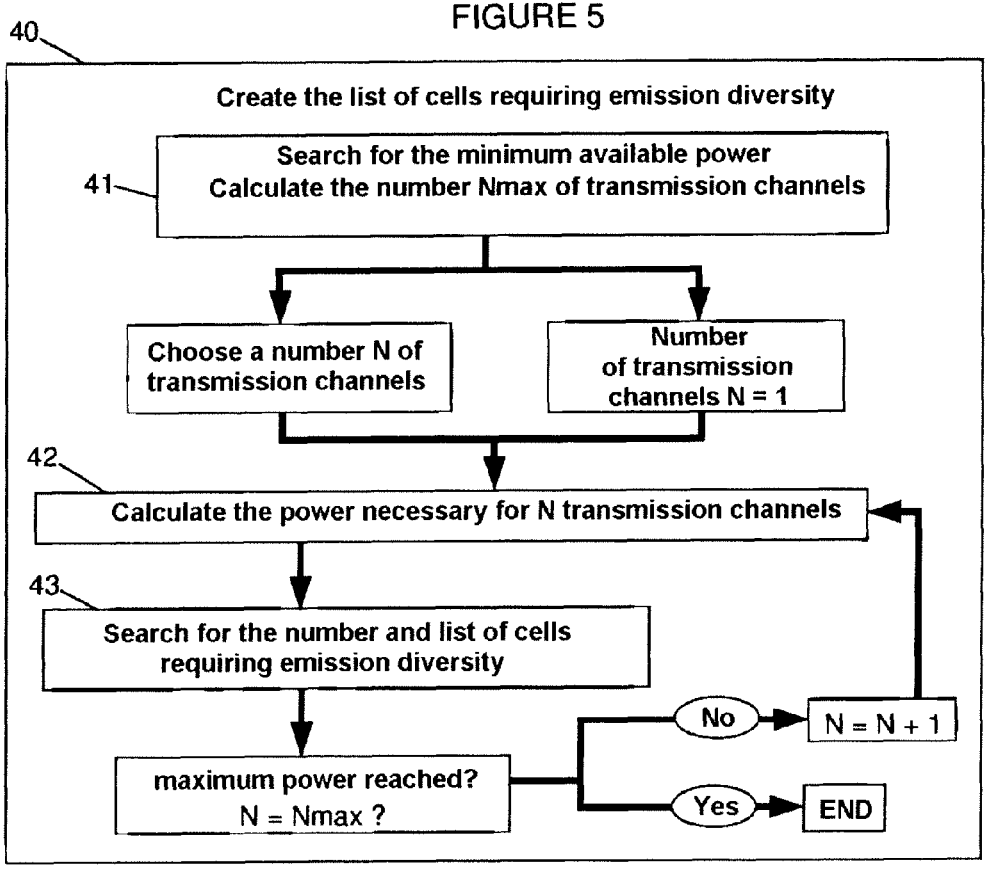
FIG. 5 shows details of an embodiment of the step to create the list of cells requiring emission diversity in the method according to the invention.
Figure 6:
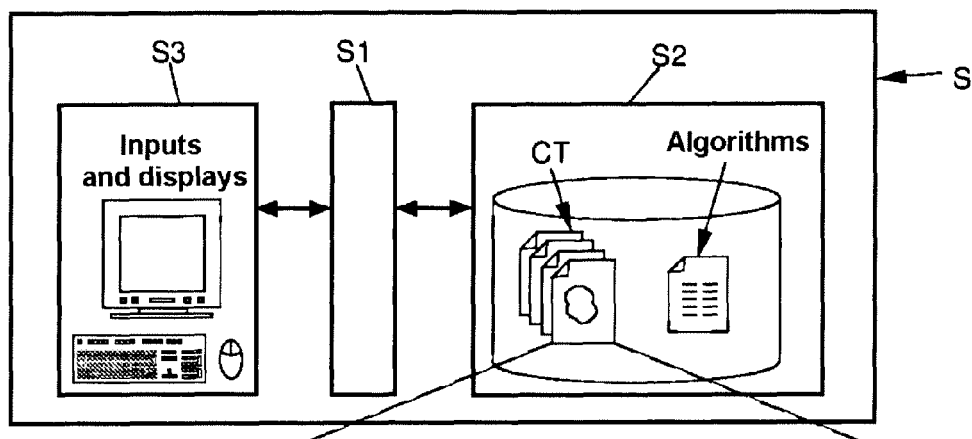
FIG. 6 shows firstly an embodiment of the simulator used to implement the method according to the invention, and secondly details of a planned traffic map according to one embodiment of the invention.
Figure 6:
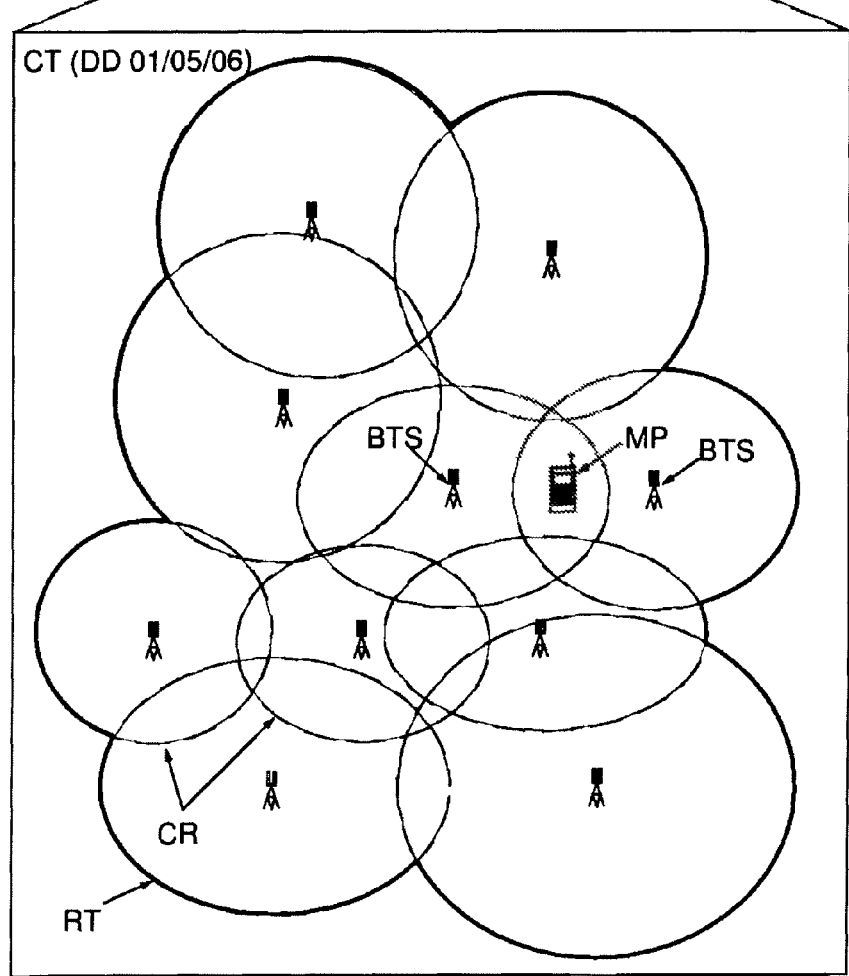

The above steps have enabled the data processing means (S1) of the simulator (S) to determine the power that will be available for each base transceiver station (BTS) in the network (RT) and for each planned deployment date (DD), to create a new service (MBMS) for which the flow is predominantly in downlink direction, in the absence and in the presence of emission diversity. This step can then be used for the creation (40) of at least one list of cells (CR) requiring the installation of emission diversity to create this new service (MBMS), by the data processing means (S1) of the simulator (S). This list will be generated as a function of at least one number (N) of transmission channels required for the service (MBMS) for which the flow is predominantly in the downlink direction and it will be stored in the memory means (S2) of the simulator (S). This step (40) to create at least one list of cells (CR) requiring installation of emission diversity includes a step (41) to search for the minimum available power in the presence of emission diversity in all cells (CR) in the network (RT). This step (41) will be used to determine the lowest power that can be released in all cells (CR) in the network (RT) when adding emission diversity. Furthermore, by knowing the power required by each transmission channel of the new service (MBMS), this step (41) can be used to determine the maximum number (Nmax) of channels that can be implemented within the network (RT). In one embodiment, the step (40) to create the list of cells requiring emission diversity may include a step in which the number (N) of channels required for the new service (MBMS) is chosen. For example, the user can input this number (N) of channels that he wants to create for the new service on the input and display means (S3) of the simulator (S). In another embodiment, the simulator will make a plurality of iterations of this step (40) to create an increasing number (N) of transmission channels until the maximum number (Nmax) of channels determined in the step (41) is reached to search for the minimum available power in the presence of emission diversity in all cells (CR) in the network (RT). Therefore, as can be seen particularly clearly in FIG. 1, the method can either use a first sequence of steps with a single iteration for the creation (40) of the list of cells requiring emission diversity to create a new service comprising a number (N) of channels chosen during a selection step (dotted line arrows at the left), or it may use a second sequence of steps with a number of iterations corresponding to the maximum number of channels (Nmax), to create a new service comprising an increasing number (N) of channels until reaching the maximum number (Nmax) of channels (dotted line arrows on the right looping back on themselves until the maximum power is reached). As can be seen particularly clearly in FIG. 5, the step (40) to create a list of cells requiring installation of emission diversity comprises the step of searching (41) for the minimum available power in the presence of emission diversity in all cells (CR) in the network (RT), and also a step of calculation (42) of the power necessary to implement at least a determined number (N) of transmission channels enabling implementation of the service for which the flow is predominantly in the downlink direction, and a step (43) to search for the number and list of cells (CR) for which the power available in the absence of emission diversity is less than the power necessary to implement the determined number (N) of transmission channels and therefore requiring the installation of emission diversity. As mentioned above with reference to FIG. 1, in one embodiment, the step (42) to calculate the power necessary to implement at least a determined number (N) of transmission channels and the step (43) to search for the number and the list of cells (CR) requiring the installation of emission diversity, could be iterated a number of times corresponding to a maximum number (Nmax) of transmission channels dedicated to the service (MBMS) for which the flow is predominantly in the downlink direction, the successive iterations being carried out for an increasing number (N) of channels until the maximum number (Nmax) of channels is reached, this maximum number (Nmax) of channels being calculated using the step (41) to search for the minimum power available in all cells (CR) in the network (RT) in the presence of emission diversity. At the end of these iterations, in one embodiment, the method may lead to a plurality of lists each corresponding to one of the iterations of this step, and in another embodiment it may lead to a single list in which each of the successive columns or lines corresponds to an iteration of this step. These two embodiments can then be used to determine the cells (CR) that require the addition of emission diversity in their corresponding base transceiver station (BTS), for the different required numbers (N) of channels. In one embodiment of the invention, the method also includes a step to calculate the cost of implementing each transmission channel dedicated to the service (MBMS) for which the flow is predominantly in the downlink direction. If the step (40) to create the list has only been iterated once for a fixed number (N) of channels chosen by the user of the simulator (S), this step can only be used to determine the cost of this fixed number (N) of channels. On the other hand, if the step to create the list has been iterated several times for an increasing number (N) of channels, this step (not shown) will be used by the data processing means (S1) of the simulator (S) due to the plurality of iterations in the step (40) to create the list of cells requiring emission diversity, as a function of the increasing number (N) of channels. The cost of each channel can then be determined by comparing either the generated lists or the different lines in a single list.

It must be obvious to persons skilled in the art that this invention enables many other forms of embodiments without going outside the spirit and scope of the invention as claimed. Consequently, these embodiments must be considered as being illustrations only, but they can be modified within the field defined by the scope of the attached claims, and the invention must not be limited to the details given above.

The invention claimed is:

1. Method of optimising the capacity of at least a WCDMA type mobile telephony network to create at least one additional service for which the data flow is predominantly in the downlink direction, by installing emission diversity within the network comprising a plurality of so called base transceiver stations, setting up communications with mobile communication terminals present in their zone of influence, called a cell, all of these cells defining the coverage zone of the network, the method being implemented by at least one computer system called a simulator, comprising memory means to store at least one algorithm controlling the following operations carried out by data processing means of the simulator:
creation of data representing the forecast coverage of the network and the power necessary for the use of services by holders of mobile communication terminals present in the coverage zone of the network, these data being generated for at least one planned deployment date of the network and grouped in the form of at least one map for each date, so-called planned traffic map, stored in the memory means of simulator;
calculation of the power available in each cell in the network in the absence of emission diversity, and then calculation of the power available in each cell in the network in the presence of emission diversity, these two calculations being dependant on the frequencies (called carrier frequencies), on which data transmissions within the network are based, and their results being stored in the memory means of the simulator;
creation of at least one list of cells for which emission diversity has to be installed as a function of at least a number of transmission channels required for the service for which the flow is predominantly in the downlink direction, this list being stored in the memory means of simulator
wherein said creation of said planned traffic map comprises:
calculation of a signal attenuation level in each cell in the network, estimated from elevation and geographic data associated with each base transceiver station in the network, resulting in the creation of data representing attenuation levels expected at each point in each cell in the network, and
calculation of the probability that a mobile communication terminal present in the coverage zone of the network can set up a communication with at least one base transceiver station, for each of the different services available within the network and for each cell in the network, this probability of access of terminals to services depending on a reception level expected at each point in each cell in the network, corresponding to a maximum power level of base transceiver stations weighted by said attenuations levels expected at each point in each cell in the network.

2. Method according to claim 1, wherein the operations in the method are implemented prior to the deployment of the network for a plurality of planned deployment dates for the network and are iterated for each of these dates.

3. Method according to claim 1, wherein the calculation of the probability of access of a mobile communication terminal to the different services available within the network comprises a comparison of the reception levels expected at each point in each cell in the network, with a minimum sensitivity threshold (pathloss threshold) to set up a communication between a base transceiver station and a mobile communication terminal, for the service considered, the standard value of this minimum sensitivity threshold (pathloss threshold) being stored in the memory means of simulator, this probability that a mobile communication terminal sets up a communication with a base transceiver station depending on the difference between the reception level expected at the point at which it is located in the cell of this base transceiver station and this minimum sensitivity threshold (pathloss threshold).

4. Method according to claim 1, wherein the calculation of the probability of access of mobile communication terminals to the different services available within the network takes account of the possibility of a mobile communication terminal setting up a simultaneous communication called soft hand-over with several base transceiver stations, using a comparison of the difference between reception levels expected at points belonging to at least two cells in the network due to the corresponding base transceiver stations for these cells to which they belong, and a minimum overlap threshold (SHO threshold).

5. Method according to claim 1, wherein the creation of at least one planned traffic map comprises a calculation, by the data processing means of simulator, of the emission power in base transceiver stations necessary to carry the planned traffic within the network, in other words the power necessary for the use of services by holders of mobile communication terminals present in the coverage zone in the network, this calculation calculating the sum of the powers at each point at which the probability of access to services is not zero in each of the cells in the network, weighted by a weight assigned to the traffic at each point, starting from an effective traffic map comprising data representing effective traffic measured earlier during a previous deployment of the network, the weight assigned to the different points of each cell being weighted by a traffic change coefficient estimated based on traffic change forecasts, the sum of the powers at each point at which the probability of access to services is not zero being calculated based on expected reception levels calculated during the step of calculation of the probability of access of terminals to the different services.

6. Method according to claim 5, wherein the calculation of the emission power necessary to carry the planned traffic comprises multiplying the sum of the powers at each point at which the probability of access to services is not zero by a power reduction coefficient depending on the efficiency of technologies on which the different services available within the network are based, this power reduction coefficient being used to weight the power estimated during the calculation of the emission power necessary to carry the planned traffic.

7. Method according to claim 6, wherein the power reduction coefficient, depending on the efficiency of technologies on which the different services available within the network are based, is stored in the memory means of simulator in relation to the planned traffic maps, the different traffic maps, corresponding to different deployment dates for the network, possibly each being associated with a different power reduction coefficient to take account of changes in the efficiency of the services due to the change in existing mobile communication terminals and transmission technologies used within the network, the method then comprising searching for the power reduction coefficient corresponding to the deployment date to which the planned traffic map currently being used by the processing means of the simulator corresponds.

8. Method according to claim 1, wherein the calculation of the available power in each cell in the network in the absence of emission diversity comprises a calculation of the number of carriers necessary to carry the planned traffic, followed by a calculation of the power available after the planned traffic has been carried, each of the carriers having a nominal power, of which a percentage is dedicated to signalling channels for this carrier and a percentage can be used to carry traffic, the calculation of the number of carriers consisting of dividing the total power necessary to carry the traffic by the percentage of the nominal power that can be used to carry the traffic, for each cell in the network, and then rounding the result of this division to the next higher integer, the calculation of the available power after the planned traffic has been carried consisting of multiplying the percentage of the nominal power that can be used to carry the traffic by the number of carriers thus calculated, for each cell in the network, then subtracting the result of this multiplication by the total power necessary to carry the traffic.

9. Method according claim 1, wherein the calculation of the available power in each cell in the network in the presence of emission diversity comprises an estimation of the gain provided by the addition of emission diversity for each transmission channel within the network, during reconfiguration of the resources in the network using at least one resource management algorithm, this gain being represented by at least one coefficient of power reduction due to the addition of emission diversity, stored in the memory means of the simulator, for each channel supporting the different services available within the network and for signalling channels, this estimation using the power reduction coefficient by adding emission diversity corresponding to the resource management algorithm that is or will be used to install emission diversity within the network.

10. Method according to claim 9, wherein the resource management algorithm concentrates available power on the first carrier common to each of the base transceiver stations so as thus to release in it the maximum power to provide the additional service for which the flow is predominantly in the downlink direction and to install emission diversity in it.

11. Method according to claim 9, wherein firstly, the resource management algorithm gives priority to the service type for which the gain provided by emission diversity is the greatest, on the carrier on which emission diversity is installed, and secondly the calculation of the power available in each cell in the network in the presence of emission diversity comprises a calculation of the difference between the percentage of the nominal power of this carrier with emission diversity that can be used to carry traffic, and the power consumed on this carrier by the service for which the gain provided by emission diversity is the greatest.

12. Method according to claim 1, wherein the creation of a list of cells requiring the installation of emission diversity comprises a searching for the minimum available power in the presence of emission diversity in all cells in the network, a calculation of the power necessary to implement at least a determined number of transmission channels necessary to provide the service for which the flow is predominantly in the downlink direction, and a searching for the number and the list of cells for which the power available in the absence of emission diversity is less than the power necessary to implement the determined number of transmission channels and therefore requiring the installation of emission diversity.

13. Method according to claim 12, wherein the calculation of the power necessary to implement at least a determined number of transmission channels and the searching for the number and list of cells requiring the installation of emission diversity are iterated, the number of iterations being equal to the maximum number of transmission channels dedicated to the service for which the flow is predominantly in the downlink direction, the successive iterations being made for an increasing number of channels until the maximum number of channels is reached, this maximum number of channels being calculated during searching for the minimum available power in all cells in the network in the presence of emission diversity.

14. Method according to claim 1, including a calculation of the cost of implementing each transmission channel dedicated to the service for which the flow is predominantly in the downlink direction, by means of the plurality of iterations of said creation of the list of cells requiring emission diversity, as a function of the increasing number of channels.

* * * * *